United States Patent [19]

Kobayashi et al.

[11] Patent Number: 4,542,325
[45] Date of Patent: Sep. 17, 1985

[54] RAIN CONDITION DEPENDENT WIPER CONTROL SYSTEM FOR AN AUTOMOTIVE VEHICLE

[75] Inventors: Kyoji Kobayashi, Chigasaki; Masaru Kato, Hiratsuka; Koichi Fujisawa, Samukawa, all of Japan

[73] Assignees: Nissan Motor Company, Limited; Jidosha Denki Kogyo Kabushiki Kaisha, both of Yokohama, Japan

[21] Appl. No.: 574,272

[22] Filed: Jan. 26, 1984

[30] Foreign Application Priority Data

Jan. 28, 1983 [JP] Japan .................................. 58-11490

[51] Int. Cl.$^4$ .............................................. B60S 1/08
[52] U.S. Cl. .................... 318/483; 318/443; 318/444; 318/DIG. 2; 15/250 C
[58] Field of Search ................. 318/443, 444, DIG. 2, 318/483; 15/250 C

[56] References Cited

U.S. PATENT DOCUMENTS

| | | | |
|---|---|---|---|
| 3,830,103 | 8/1974 | Andrjkovics et al. | 73/170 R |
| 3,926,120 | 12/1975 | Williams et al. | 102/210 |
| 4,317,073 | 2/1982 | Blaszkowski | 318/313 X R |
| 4,329,631 | 3/1982 | Betsch et al. | |
| 4,375,610 | 6/1983 | Nagaoka et al. | |
| 4,388,574 | 7/1983 | Bois et al. | |

FOREIGN PATENT DOCUMENTS

| | | | |
|---|---|---|---|
| 0535699 | 4/1979 | Australia . | |
| 2621116 | 11/1977 | Fed. Rep. of Germany . | |
| 2465618 | 4/1981 | France | 318/443 |
| 48-22736 | 7/1973 | Japan . | |
| 53-4931 | 1/1978 | Japan . | |
| 53-86422 | 7/1978 | Japan . | |
| 4912617 | 3/1979 | Japan . | |
| 55-63941 | 5/1980 | Japan . | |
| 55-66738 | 5/1980 | Japan . | |
| 56-43052 | 4/1981 | Japan . | |
| 56-47336 | 4/1981 | Japan . | |
| 57-130747 | 1/1982 | Japan . | |
| 57-60945 | 4/1982 | Japan . | |
| 57-181655 | 5/1982 | Japan . | |
| 57-74249 | 5/1982 | Japan . | |
| 57-144753 | 9/1982 | Japan . | |
| 57-198146 | 12/1982 | Japan . | |
| 1101441 | 1/1968 | United Kingdom | 318/443 |

OTHER PUBLICATIONS

Australian Patent Abridgement—AU-B-51186/-79—Raymond Noack.
W. D. Kraengel, Jr., "Delay Circuit Retains Dynamic Braking to Stop Coasting of Windshield Wipers", *Electronic Design*, vol. 27, p. 19 (Sep. 1979).

*Primary Examiner*—William M. Shoop, Jr.
*Assistant Examiner*—Bentsu Ro
*Attorney, Agent, or Firm*—Schwartz, Jeffery, Schwaab, Mack, Blumenthal & Evans

[57] ABSTRACT

In an automotive windshield wiper control system, a rain sensor provides a rain condition-indicative signal useful in controlling the wiper in its intermittent operation mode. That signal is integrated to yield a value representing rain accumulation on the windshield, and when the integrated value exceeds a given threshold, the wiper is reciprocated once to clear the windshield. In order to prevent arhythmic wiper operation, the signal integrator is disabled during wiper operation so that the integrated value will not approach the threshold too soon after or even before the end of the preceding wiper operation cycle.

11 Claims, 5 Drawing Figures

RAIN CONDITION DEPENDENT WIPER CONTROL SYSTEM FOR AN AUTOMOTIVE VEHICLE

BACKGROUND OF THE INVENTION

The present invention relates generally to a wiper control system which controls wiper operation in accordance with rain conditions, and in particular controls intermittent wiper operation by adjusting the intervals between wiper strokes in accordance with rain conditions. More specifically, the invention relates to a wiper control circuit which can satisfactorily and successfully prevent unpredictable operation of the wiper.

In recent years, various kinds of rain condition-dependent wiper control systems have been developed and proposed. Rain sensors which produce rain condition-indicative signals having values representative of rain conditions have been developed. Control systems generally include a controller responsive to the rain indicative signal to produce a control signal which dictates wiper operations such as the intervals between intermittent wiper strokes.

For example, Published Japanese Utility Model Application No. 57-130747, published on Aug. 14, 1982, discloses an automatic control system for an automotive wiper. The automatic control system includes a vibration pick-up which detects vibrations of the front windshield due to the impact of rain drops. The output signal of the vibration pick-up is amplified, filtered and then compared with a threshold to produce a driver signal when the output signal level exceeds the threshold level. In addition, Published Japanese Utility Model Application No. 57-181655, published on Nov. 17, 1982, discloses a wiper control system which is provided with a rain sensor and a comparator for comparing the rain sensor signal, the value of which gradually increases at a rate depending upon rain conditions. The comparator produces a drive signal when the sensor signal value reaches a predetermined threshold to intermittently operate the wiper.

In such a wiper control system, the rain sensor signal value is effectively integrated until the integrated value reaches the predetermined threshold. Generally, the integrated value is cleared in response to output of the drive signal and integration of the value starts immediately after clearing the preceding integrated value. Therefore, under relatively heavy rain conditions, it is possible that the integrated value from the subsequent integration operation will exceed the threshold before the wiper completes the preceding cycle of operation. This may result in irregular and unpredictable wiper operation.

On the other hand, significant changes in wiper operation interval on a cycle-to-cycle basis may disturb the driver with an irregular rhythm. This irregular wiper operation may result in conventional wiper control systems.

SUMMARY OF THE INVENTION

Therefore, it is an object of the present invention to provide a wiper control system which allows variable timing of wiper operations without allowing significant cycle-to-cycle fluctuations.

Another and more specific object of the present invention is to provide a wiper control system which ensures moderate cycle adjustments in the intermittent mode of wiper operation.

To accomplish the foregoing and other objects, a wiper control system, according to the present invention, includes a rain sensor producing a rain condition-indicative signal having a value which varies according to rain conditions. The rain sensor is associated with a drive signal generator for producing a wiper drive signal when the integrated value of the rain condition-indicative signals exceeds a wiper drive threshold. The drive signal generator is associated with a disabling means which disables the integration operation of the former while the wiper is in operation. The disabling means enables the drive signal generator to integrate the rain condition-indicative signal value after the end of wiper motion is detected. To detect the end of wiper motion, a wiper position detector is provided to produce an enabling command to the disabling means at the end of each cycle of wiper operation.

According to one aspect of the invention, a rain condition dependent wiper control system comprises a windshield wiper, a mode selector allowing manual selection of a plurality of variable operational modes of the wiper including an intermittent wiping mode, a rain sensor adapted to detect rain conditions and produce a rain condition signal having a value which varies according to rain conditions, a wiper drive circuit including an intermittent operation control circuit which includes an integrating means for integrating the rain condition signal value to produce a drive signal and actuate a wiper driver for one cycle of wiper operation whenever the integrated value exceeds a given threshold, and a detector adapted to detect when the wiper is in either a first initial position or a second operating position, the wiper position detector associated with the integrating means for disabling the latter while the wiper is in the second position.

BRIEF DESCRIPTION OF THE DRAWINGS

The present invention will be understood more fully from the detailed description given herebelow and from the accompanying drawings of the preferred embodiments, which, however, should not be taken to limit the invention to the specific embodiments but are for explanation and understanding only.

In the drawings.

DESCRIPTION OF THE PREFERRED EMBODIMENTS

Figure 1:
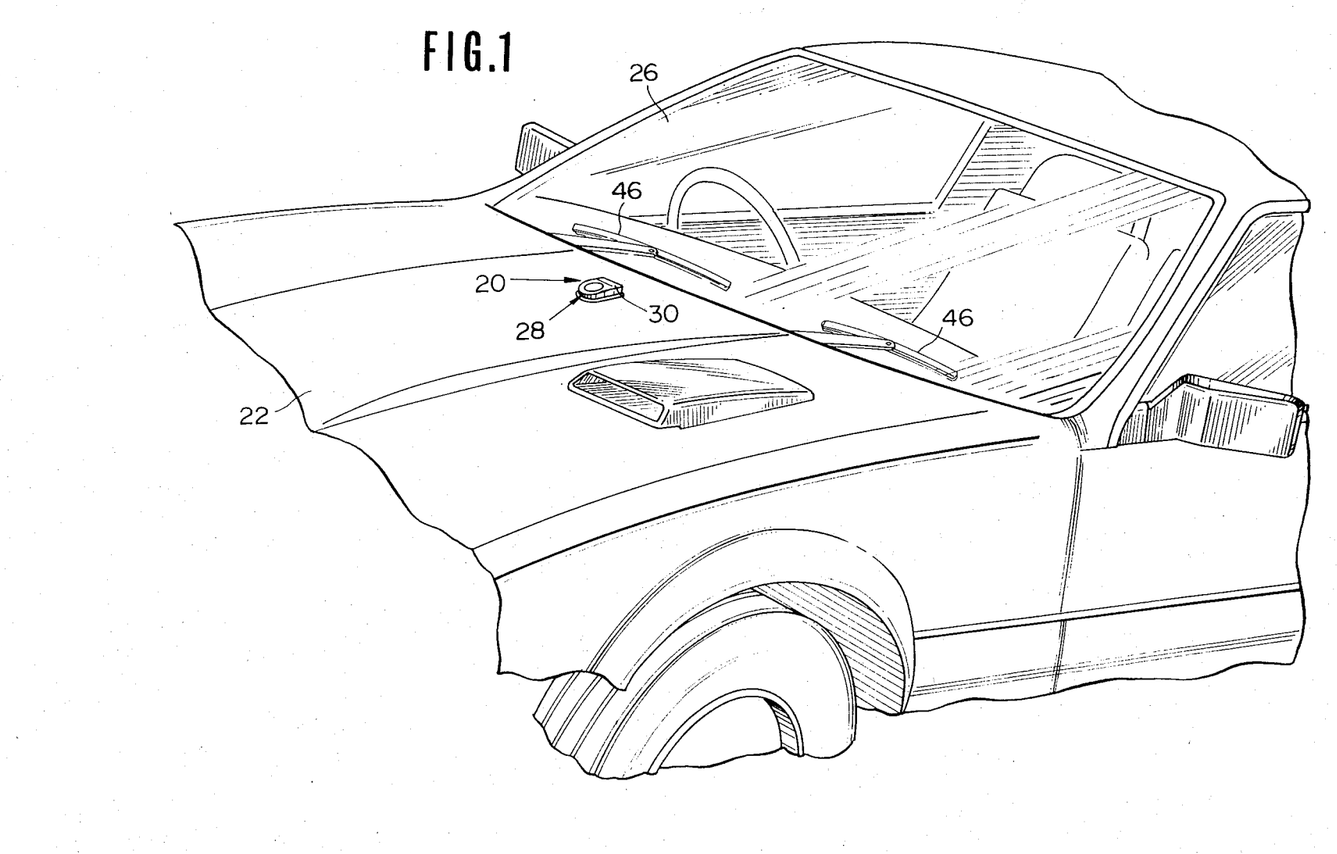
FIG. 1 is a perspective view of a part of an automotive vehicle on which the preferred embodiment of a rain sensor according to the present invention is mounted.
Figure 2:
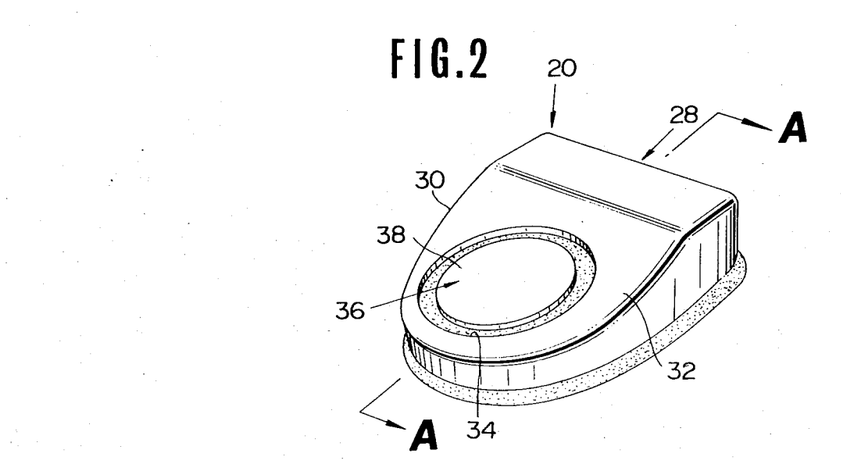
FIG. 2 is an enlarged perspective view of the preferred embodiment of the rain sensor of FIG. 1.

Referring now to the drawings, particularly to FIGS. 1 and 2, a rain sensor 20 is usually mounted on the engine hood 22 or the cowl top panel near the front windshield 26 in order to detect rain conditions around the windshield. A sensor casing, which is generally represented by the reference numeral "28", has an upper cover member 30. The upper cover member 30 has one surface 32 tilted or inclined downwardly towards the front end of the vehicle. The tilt angle of the inclined surface 32 of the upper cover member 30 is preferably in the range of about 5° and 25°, which has been experimentarily recognized to maximize sensitivity to rain conditions. A generally circular opening 34 is formed in the upper cover member 30, allowing the upper surface 38 of a vibrator, which is generally represented by the reference numeral "36", to be exposed to the atmosphere. The vibrator 36 is elastically suspended from the sensor casing 28 in order to be able to vibrate when rain drops impinge thereupon. The vibrator 36 is adapted to produce a vibration-indicative signal, the value of which varies in dependence upon the amplitude and frequency of vibration which, in turn, depend upon the force of impact of rain drops on the vibrator.

Figure 3:
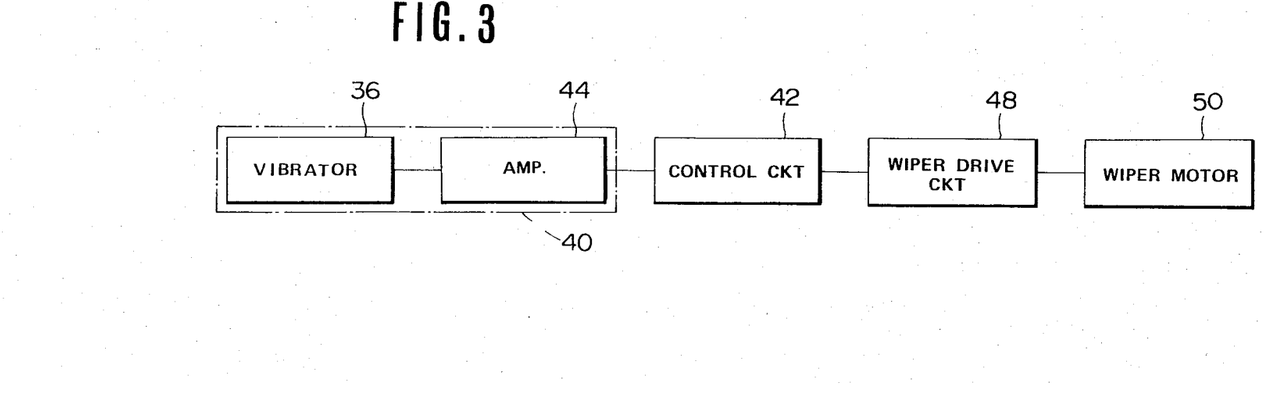
FIG. 3 is a schematic block diagram of a wiper speed control system to which the preferred embodiment of the rain sensor according to the present invention is applied.

The vibrator 36 is associated with a sensor circuit, schematically illustrated in FIG. 3, which is generally represented by the reference numeral "40". This wiper drive control circuit has been disclosed in the aforementioned U.S. patent application No. 527,776 corresponding to European Patent Application No. 83108597.2. The disclosures of the aforementioned co-pending Patent Applications are hereby incorporated by reference.

In summary, the vibration-indicative signal produced by the vibrator 36 is fed to a control circuit 42 via an amplifier 44 which is adapted to amplify the vibration-indicative signal level sufficiently for application to the control circuit. The control circuit processes the amplified vibration-indicative signal to derive the operational timing of a front windshield wiper 46 in accordance with detected rain conditions. In the shown embodiment, the control circuit 42 determines the intervals between intermittent operation of the wiper 46 while operating in INTERMITTENT mode. However, it would also be possible to control the wiper operation by varying the wiper speed according to the rain conditions detected even when the wiper is operated in LOW-speed mode and/or HIGH-speed mode.

In the case of controlling the intermittent-operation interval, the control circuit 42 outputs a driver signal whenever a summed or counted vibration-indicative signal value becomes equal to or greater than a predetermined value. A driver circuit 48 is connected to the control circuit 42 to receive the driver signal to actuate a driver motor 50 for one cycle of wiper operation each time the driver signal is received.

Figure 4:
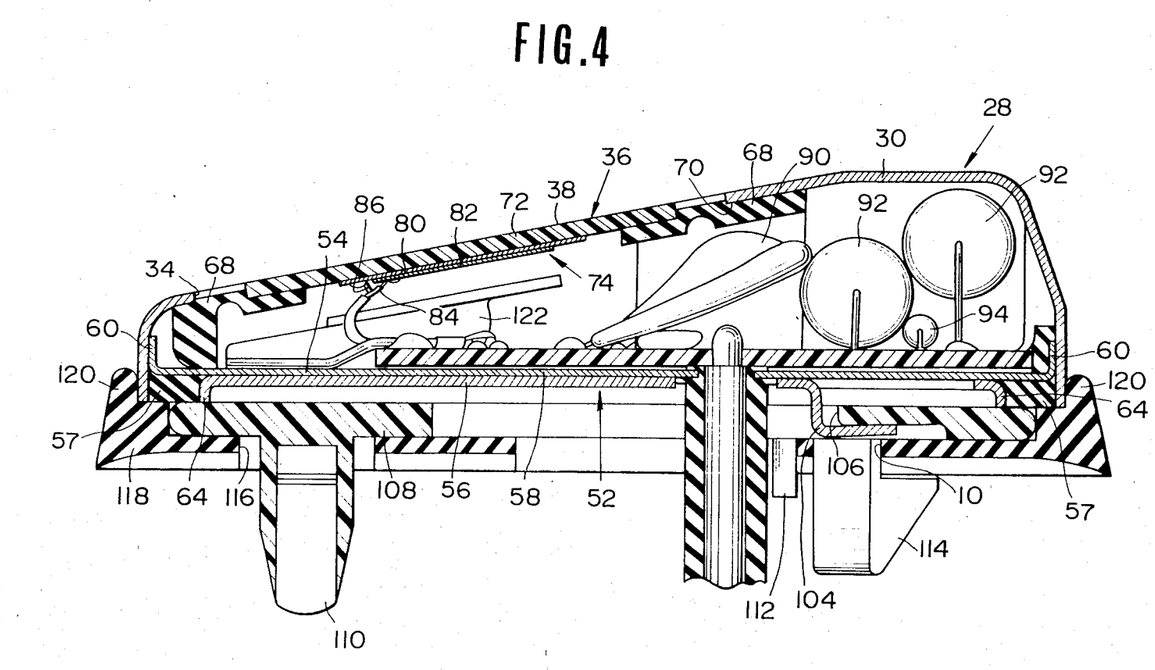
FIG. 4 is a longitudinal section of the first embodiment of the rain sensor taken along line A—A in FIG. 2.

FIG. 4 shows the detailed structure of the first embodiment of the rain sensor according to the present invention. The upper cover member 30 of the sensor casing engages a lower base member which is generally represented by the reference numeral "52" to form a water-proof sensor casing. The lower base member 52 comprises a first base 54 and a second base 56. The first base 54 is adapted to support the sensor circuit including the amplifier 44 and the control circuit 42. The first base 54 has a horizontal major section 58 and a circumferential flange 60 which turns upwards from the circumferential edge of the major section. The second base 56 also has a horizontal major section mating with the lower surface of the major section 58 of the first base 54, and a circumferential flange 64 bent downwards from the circumferential edge of the major section. The mating surfaces of the first and second bases 54 and 56 are bonded together. The first and second bases 54 and 56 define a space with said upper cover member which space is filled with a sealer 57 for liquid-tight engagement between the bases and the upper cover member. An elastic rubber 68 is fitted to the lower or inner surface 70 of the upper cover member 30 around the circular opening 34. The elastic rubber is fixed to the mating surface by way of vulcanization. The elastic rubber may also engage the flange 60 of the first base 54 to establish a water-proof seal therebetween.

As shown in FIG. 4, the vibrator 36 comprises a vibration plate 72 in the form of a circular disc and a vibration detector member 74 secured to the lower surface of the vibration plate. The vibration plate 72 has a smaller diameter than that of the circular opening 34 in the upper cover member 30. The circumferential edge of the vibration plate 72 is secured to the elastic rubber 68 by way of vulcanization so that it remains free to vibrate or oscillate in response to the impact of rain drops on the exposed surface 38.

As shown in FIG. 4, the vibration detector member 74 is attached or bonded to the lower surface of the vibration plate 72 and compresses an electrically conductive plate 80 in intimate contact with the lower surface of the vibration plate 72, and a piezoelectric element 82 attached to the conductive plate 80. The piezoelectric element 82 is bonded to the lower surface of the conductive plate 80 by means of an appropriate glue or adhesive. The conductive plate 80 and the piezoelectric element 82 are connected to the sensor circuit 40 to supply the vibration indicative signal produced in response to vibrations due to the impact of rain drops on the exposed surface 38 of the vibration plate 72, via conductive wires 84 and 86 respectively.

As best shown in FIG. 4, the second base has a bent hook portion 104 engageable with an opening 106 formed in a fastener plate 108. The fastener plate 108 is providing with three hooks 110, 112 and 114 extending downwards from its lower surface. Each hook 110, 112 and 114 of the fastener plate 108 extends through a corresponding through opening 116 formed in a rubber mat 118 with a circumferential, upwardly-extending wall 120. The hooks 110, 112 and 114 are adapted to resiliently engage the vehicle body in order to secure the sensor casing 28 to the rubber mat 118 and so to the vehicle body. Alternatively, the rubber mat 118 may be elastically attached to the engine hood or cowl top panel to establish water-tight engagement therebetween. The peripheral wall 120 of the rubber mat 118 is adapted to snugly fit the outer periphery of the upper cover member 30 in order to establish a water-proof seal therebetween.

The first base 54 is bent upwards along its lateral edges to form upward extensions 122 which serve as a stopper for the vibrator to restrict its downward movement. The upper end of the upper extensions 122 are accordingly positioned a given distance below the vibration plate 72. The extension 122 may prolong the life of the elastic rubber by preventing excessive downward movement of the vibrator even when relatively strong external forces are applied thereto.

Figure 5:
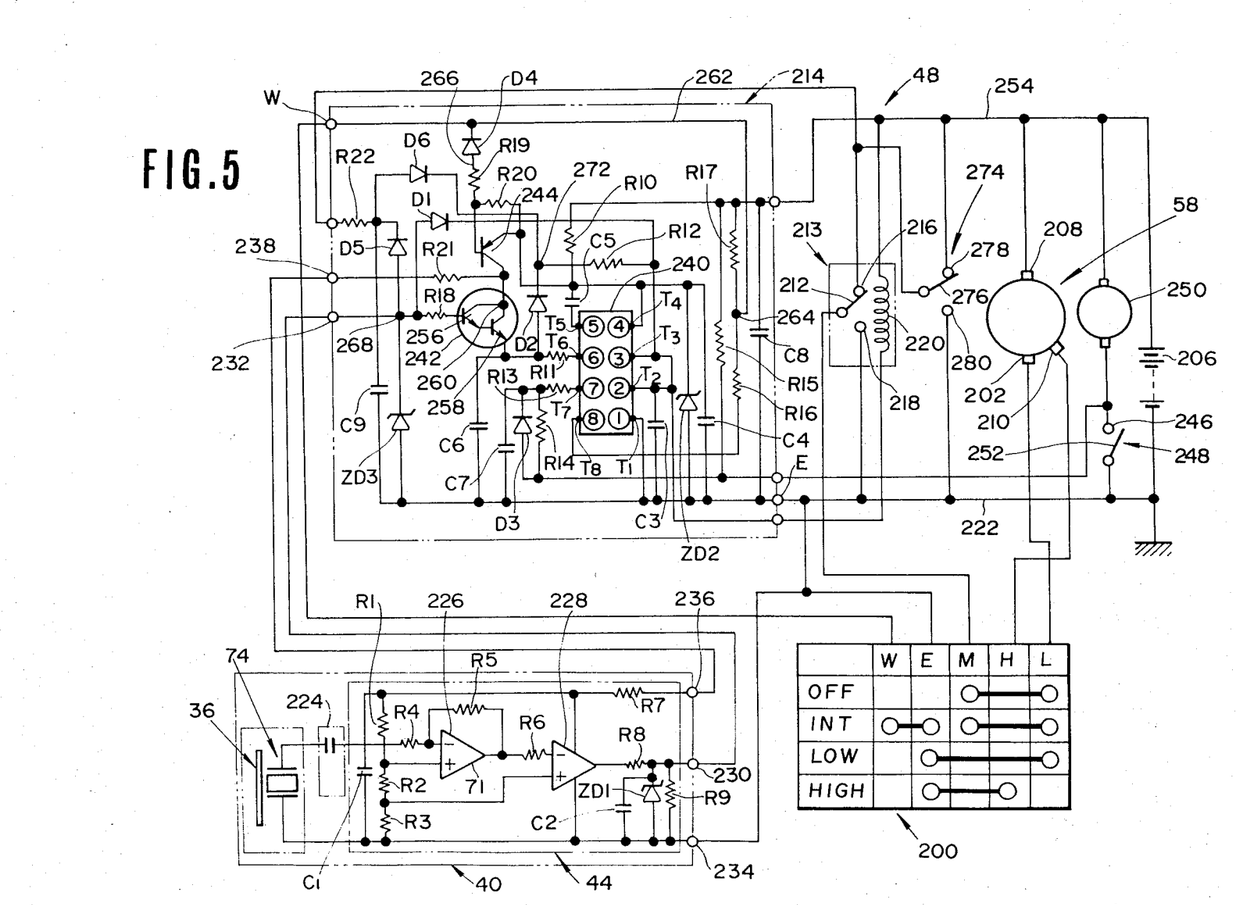
FIG. 5 is a circuit diagram of the preferred embodiment of the wiper control system according to the present invention.

Now, referring to FIG. 5, in which the preferred embodiment of the wiper control system according to the present invention is illustrated in the form of a circuit diagram, a manual mode selector switch 200 may include a manual operation switch element (not shown) installed on the steering column or some other appropriate position near the driver's seat. The mode selector switch 200 has a LOW-speed terminal L, a HIGH-speed terminal H, a terminal M, an earth terminal E and an INTERMITTENT (INT) terminal W. The LOW-speed terminal L is connected to a LOW-speed contactor 202 of a wiper driver motor 58, a power supply terminal 208 of which is connected to a (+) terminal of a vehicle battery 206. The HIGH-speed terminal H is connected to a HIGH-speed contactor 210 of the wiper drive motor 58. The terminal M is connected to a movable contact 212 of a wiper relay 213 which includes stationary contacts 216, 218 and a relay coil 220. The earth terminal E is connected to ground via a lead 222 and to ground terminal 234 of rain sensor circuit 40 via the amplifier 44. The INTERMITTENT terminal W is connected to an intermittent drive circuit 214 in the wiper drive circuit 48.

The sensor circuit 40 includes the vibrator 36 and the vibration plate 72 adapted to vibrate or oscillate in the ultra-sonic frequency range. The vibration detector member 74 comprises the conductive plate 80 and the piezoelectric element 82. The vibration detector member 74 is adapted to produce a rain condition-indicative signal which reflects variations of vibration amplitude of vibrator 36 and having a frequency in the ultrasonic band. The vibration detector member 74 is connected to the amplifier 44 via a filter 224 including a filtering capacitor. This filter 224 acts as a band-pass filter to pass only the ultrasonic components of the rain condition-indicative signal. The amplifier 44 is an alternating-current amplifier and comprises differential amplifiers 226 and 228, capacitors $C_1$ and $C_2$ which are both labelled "92" in FIG. 4, a Zener diode $ZD_1$ and resistor $R_7$ which is labelled "94" in FIG. 4.

The amplifier 44 amplifies the rain condition-indicative signal and outputs the amplified signal via its output terminal 230 which is connected to the input terminal 232 of the intermittent drive circuit 214. Another terminal 234 of the amplifier 44 is also connected to the earth lead 222 and so to the earth terminal E of the manual selector switch 200. The amplifier has an additional terminal 236 connected to a terminal 238 of the intermittent drive circuit 214 to receive electrical power. Therefore, the rain sensor is active while the voltage at terminal 238 of the intermittent drive circuit 214 is HIGH.

The intermittent drive circuit 214 comprises an integrated circuit (IC) 240, transistors 242 and 244, resistors $R_{10}$–$R_{22}$, Zener diodes $ZD_2$ and $ZD_3$, diodes $D_1$–$D_6$ and capacitors $C_3$–$C_9$. The integrated circuit 240 is provided with an earth terminal $T_1$, output terminals $T_2$ and $T_3$, a power supply terminal $T_4$, an oscillation-suppression terminal $T_5$, a charge detector terminal $T_6$, a washer terminal $T_7$ and rain sensor terminal $T_8$. The output terminals $T_2$ and $T_3$ are connected in common to the relay coil 220 of the wiper relay 213. The output terminal $T_2$ is also connected to the earth lead 222 via the capacitor $C_3$. The output terminal $T_3$ is also connected to the output terminal 230 of the rain sensor circuit 40 via the diode $D_1$. The power supply terminal $T_4$ is connected to the (+) terminal of the battery 206 via the resistor $R_{10}$. The oscillation suppression terminal $T_5$ is also connected to the (+) terminal of the battery 206 via the capacitor $C_5$ and the resistor $R_{10}$. On the other hand, the power terminal $T_4$ is connected to the earth lead 222 via Zener diode $ZD_2$ and capacitor $C_4$ which are connected in parallel. In this circuit arrangement, the constant voltage difference between the power terminal $T_4$ and the earth terminal $T_1$ is applied across Zener diode ZD2. The charge detector terminal $T_6$ is also connected to the earth lead 222 via resistor $R_{11}$ and the capacitor $C_6$ connected in series. The charge detector terminal $T_6$ is also connected to the output terminal $T_3$ via the resistor $R_{11}$, the diode $D_2$ and the resistor $R_{12}$ connected in series. The washer terminal $T_7$ is connected to the earth lead 222 via the series-connected resistor $R_{13}$ and capacitor $C_7$. The resistor $R_{14}$ and the diode $D_3$ are connected in parallel to one terminal of the resistor $R_{13}$. The resistor $R_{14}$ and the diode $D_3$ are connected to the battery 206 via the resistor $R_{15}$ and to a terminal 246 of a washer switch 248, which is generally disposed near the driver's seat, e.g. on the steering column and is adapted to operate a washer pump 250 and the wiper drive motor 58 when a movable contact 252 is depressed into contact with the terminal 246. The rain sensor terminal $T_8$ is connected to the battery 206 via resistors $R_{16}$ and $R_{17}$. The INTERMITTENT terminal W is connected to the junction of the resistors $R_{16}$ and $R_{17}$. The capacitor $C_8$ inserted between the lead 254 from the battery to the earth lead 222 serves to suppress noise due to fluctuation of the battery voltage and so forth.

The element 242 comprises two transistors connected to form a Darlington circuit. The base electrode 256 is connected to the output terminal 230 of the sensor circuit 40 via resistor $R_{18}$. The emitter electrode 258 is connected to the junction of the resistor $R_{11}$ and the capacitor $C_6$ which serves to integrate the rain condition-indicative signal value and to produce a drive signal when the integrated value reaches a predetermined threshold. The threshold may correspond to the discharge voltage of the capacitor $C_6$. Therefore, the capacity of the capacitor $C_6$ may define a wiper intermittent operation threshold. The collector electrode 260 is connected to the collector electrode of the transistor 244. The base electrode of the transistor 244 is connected to a lead 262 connecting the junction 264 between the resistors $R_{16}$ and $R_{17}$ to the INTERMITTENT terminal W of the mode selector switch 200 via a lead 266 in which resistor $R_{19}$ and the diode $D_4$ are connected in series. The emitter electrode of the transistor 244 is connected to the power lead 254 at the junction of the resistor $R_{10}$ and the capacitor $C_5$. The emitter electrode is also connected to the base electrode via the resistor $R_{20}$. The collector electrode of the transistor 244 is connected to the collector electrode 260 of the transistor circuit 242 and to the power supply terminal 236 of the rain sensor 40 via resistor $R_{21}$.

The movable contact 212 of the wiper relay 213 is normally biased toward the stationary terminal 216 which is connected to the earth lead 222 via the resistor $R_{22}$, the diode $D_5$ and Zener diode $ZD_3$. The output terminal 230 of the rain sensor circuit 40 is connected to the junction 268 between the diode $D_5$ and the Zener diode $ZD_3$, which junction 268 is, in turn, connected to the base electrode 256 of the transistor 242 via $R_{18}$. The junction between the resistor $R_{22}$ and the diode $D_5$ is connected to the junction 272 between the diode $D_2$ and the resistor $R_{12}$ via the diode $D_6$. One end of the relay coil 220 is connected to the power lead 254 and the other end is connected to the output terminals $T_2$ and $T_3$ of the integrated circuit 240.

In the above arrangement, when the mode selector switch is manually turned OFF, the LOW-speed terminal L is connected to the terminal M. Since the terminal M is connected to the movable contact 212 of the wiper relay 213 which is in contact with the stationary terminal 216 while the relay coil is not energized, electrical power is not supplied to the wiper motor 58. Thus, the wiper motor 58 remains inoperative. In this case, the potentials at the washer terminal $T_7$ and the rain sensor terminal $T_8$ remain HIGH and the potential at the charge detector terminal $T_6$ remains above a predetermined voltage. Since the capacitor $C_6$ is connected to the charge detector terminal $T_6$, the charge voltage across the capacitor $C_6$ is the same as that at the charge detector terminal.

Under these conditions, if the washer switch 248 is turned ON, the washer terminal $T_7$ is grounded via the washer switch 248 so that the potential there goes LOW. In this case, the potential at the charge detector terminal $T_6$ is still above the predetermined voltage. As a result, the potentials at the output terminals $T_2$ and $T_3$ go LOW, thus energizing the relay coil 220. The movable contact 212 of the wiper relay 213 is responsive to energization of the relay coil 220 to switch connection from the terminal 216 to the terminal 218. Thus, current from the battery 206 flows through the wiper motor 58, the terminals L and M, the movable contact 212 and the earth lead 222. As a result, the wiper motor 58 is driven while the washer switch is held in the ON position.

During this wiper operation, a wiper position switch 274 is active to detect the end of each cycle of wiper operation. The wiper position switch 274 includes a movable switch element 276 associated with the wiper blade so as to move with the wiper blade. Alternatively, the movable switch element may be associated with the output shaft of the wiper motor 58 for rotation therewith. While the wiper is in motion, the movable switch element 276 remains in contact with a stationary contact 280. On the other hand, at the end of each wiper stroke, the movable switch element 276 is adapted to contact with a second stationary contact 278.

If the washer switch is turned OFF while the wiper is in motion, the potential at the washer terminal $T_7$ goes HIGH to raise the potentials at the output terminals $T_2$ and $T_3$ to HIGH level. This results in deenergization of the relay coil 220 which switches connection of the movable contact 212 to the terminal 216 from the terminal 218. However, since the terminal 280 of the wiper position switch 274 is still connected to the earth lead 222, drive power from the battery 206 still flows through the wiper motor 58, the terminals L and M, the movable contact 212, the terminal 216, the movable switch element 276 and the terminal 280. When the wiper reaches the end of its stroke, the movable switch element 276 moves into contact with the terminal 278, thus disabling power supply to the wiper motor 58 and stopping the wiper operation. To accurately stop the wiper at its initial position, the wiper motor 58 may be provided with an electromagnetic brake which becomes active in response to termination of power supply. Thus, the wiper is stopped at its initial position after the washer switch 248 is turned off.

When the mode selector switch 200 is shifted to LOW-speed mode from the OFF position, the LOW-speed terminal L is connected to the earth terminal E to establish an electrical current flow path through the wiper motor 58, the terminals L and E and the earth lead 222. Therefore, the wiper is continuously operated at a predetermined LOW-speed. When the mode selector switch 200 is turned OFF while the wiper is in motion, the electric current flows through the wiper motor 58, the terminals L and M, the movable contact 212 of the wiper relay 213, the terminal 216, the movable switch element 276 and the terminal 280 until the wiper reaches the end of its stroke, i.e. its initial position and thus the movable switch element 276 is moved to the terminal 278. Similarly, when the mode selector switch 200 is shifted to HIGH-speed mode, the HIGH-speed terminal H is connected to the earth terminal E to establish an electric current path which enables wiper motor 58 operation. When the mode selector switch 200 is turned OFF, the circuit remains closed via the wiper position switch 274 until the wiper returns to its initial position.

When the INTERMITTENT operational mode is selected by means of the mode selector switch 200, the LOW-speed terminal L is connected to the terminal M as in the OFF position of the mode selector switch. Additionally, the INTERMITTENT terminal W is brought into contact with the earth terminal E. In this case, the rain sensor terminal $T_8$ which is connected to the INTERMITTENT terminal W via the resistor $R_{16}$ and lead 262 is grounded via the earth lead 222 and the earth terminal E. At this time, the potential at the charge detector terminal $T_6$ remains above the predetermined voltage. Thus, the potentials at the output terminals $T_2$ and $T_3$ go LOW, energizing the relay coil 220 of the wiper relay 213. In response to energization of the relay coil 220, the movable contact 212 of the wiper relay 213 moves into contact with terminal 218 to connect the terminal M of the mode selector switch 200 to the earth lead 222. As a result, the wiper motor 58 is activated to operate for one cycle of wiper operation.

At the moment of initiation of the first cycle of wiper operation, the charged voltage across the capacitor $C_6$ is discharged through the diode $D_2$, the resistor $R_{12}$ and the output terminals $T_2$ and $T_3$. Thus, the potential in the capacitor $C_6$ drops below the predetermined voltage, thus causing the potential at the output terminals $T_2$ and $T_3$ to go HIGH. As a result, the relay coil 220 of the wiper relay 213 is deenergized so that the movable contact 212 returns to the terminal 216. As set forth above, even after the movable contact 212 is returned to initial position, the power supply to the wiper motor 58 is maintained via the terminal 216, the movable switch element 276 of the wiper position switch 274 and the terminal 280 while the wiper is in operation. At the end of the wiper stroke, the movable switch element 276 of the wiper position switch 274 returns to the terminal 278 to stop the wiper motor 58.

As will be appreciated herefrom, in response to turning the mode selector switch 200 to INTERMITTENT mode, the wiper is operated for one cycle of operation and then returned to a stand-by state for operation according to the rain condition-indicative signal supplied by the rain sensor.

Under these conditions, the base electrode of the transistor 244 is connected to earth lead 222 via the INTERMITTENT terminal W of the mode selector switch to drop the potential there to LOW level. As a result, the transistor 244 turns ON to apply electric power to the rain sensor circuit 40 through the resistor $R_{21}$ and the power terminal 236. The rain sensor circuit 40 thus becomes active to detect rain conditions and produce the rain condition-indicative signal according to rain conditions.

When rain drops or the like impinge upon the sensor surface 38 of the vibrator 36, the vibration plate 72 vibrates at a magnitude corresponding to the impact, e.g. size of each individual rain drop hitting the sensor surface, wind speed, and so forth. The vibration detector member 74 is thus vibrated together with the vibration plate 72 to produce the rain condition-indicative signal in the form of a wave of decaying amplitude. The rain condition-indicative signal is fed to the amplifier 44 through the filter 224. The amplified rain condition-indicative signal output by the amplifier 44 is applied to the base electrode 256 of the transistor 242. The transistor 242 turns ON or OFF depending upon the rain condition-indicative signal value. The capacitor $C_6$ is charged by the voltage from the battery 206 supplied through the resistor $R_{10}$, the transistor 244 and the transistor 242. When the potential across the capacitor $C_6$ exceeds the predetermined voltage, the potential at the output terminals $T_2$ and $T_3$ goes LOW to again energize the relay coil 220. The movable contact 212 thus moves into contact with the terminal 218 to establish an electrical circuit via the wiper motor 58, the terminals L and M, the wiper relay 213 and the earth lead 222. The wiper motor 58 is responsive to the power supply to drive the wiper.

At the same time, when the potential at the output terminals $T_2$ and $T_3$ drops LOW, the potential at the junction 268 goes to earth. As a result, the rain condition-indicative signal from the rain sensor is discharged through the diode $D_1$ and output terminals $T_2$ and $T_3$. As a result, the input at the base electrode of the transistor 242 terminates and turns same OFF.

At this time, the charge on the capacitor $C_6$ is discharged through the diode $D_2$, the resistor $R_{12}$ and the output terminals $T_2$ and $T_3$, thus dropping the potential there LOW. In response to this drop in the potential of the capacitor, the potential at the output terminals $T_2$ and $T_3$ goes HIGH to deenergize the relay coil 220. The movable contact 213 is thus moved into contact with the contact 216 to connect the terminal M to the wiper position switch 274. During wiper movement, the movable switch element 276 of the wiper position switch 274 is in contact with the terminal 280. Thus, the terminal M is still connected to the earth lead 222. As a result, the potential at the junction 268 remains LOW, cutting off the input from the rain sensor circuit to the base electrode 256 of the transistor 242.

Since the integrated circuit 240 is so designed that the potential at the output terminals $T_2$ and $T_3$ drops LOW when the charge on the capacitor $C_6$ exceeds the predetermined level, the charge on the capacitor $C_6$ will be approximately constant. Also, its discharge characteristics may be determined such that the discharge rate of the capacitor $C_6$ remains essentially constant. Therefore, in accordance with the discharge time constant of this charge through the diode $D_2$, the resistor $R_{12}$ and the terminals $T_2$ and $T_3$, the period of time for which the potential at the output terminals $T_2$ and $T_3$ remains LOW will be approximately constant. In other words, the duration of energization of the relay coil 220 will be a constant related to the determined discharge time constant. This duration has to be shorter than the duration of one cycle of wiper operation so that the wiper can be stopped at the end of any one wiper operation cycle.

After the period of time corresponding to the discharge time constant expires, the potential at the output terminals $T_2$ and $T_3$ goes HIGH due to the voltage in the capacitor $C_6$ being lower than the predetermined voltage. Therefore, the relay coil is deenergized. The potential in the capacitor $C_6$ will remain lower than the predetermined voltage, i.e., the capacitor $C_6$ will not be charged even after the relay coil is deenergized until the wiper position switch detects the end of the wiper stroke.

Immediately after the wiper position switch detects the end of a wiper stroke, the potential at the junction 268 goes HIGH and allows the rain condition-indicative signals to be applied to the base electrode 256 of the transistor 242 to turn the latter ON or OFF depending upon the rain condition-indicative signal value. Thus, the capacitor $C_6$ is charged. The period of time required for the capacitor $C_6$ to be charged to a voltage above the predetermined voltage varies in accordance with the rain condition-indicative signal value and thus, in turn, with rain conditions.

As set forth above, the present invention assures accurate driver control in accordance with rain conditions during intermittent wiper operation. Therefore, the invention fulfills the sought objects and advantages to provide a wiper control system which can be used comfortably.

While the specific embodiment has been disclosed hereabove in order to fully describe the invention, it should be appreciated that the invention is not to be limited to the described specific embodiment but should be understood to include all possible modifications and embodiments including the essential features set out in the appended claims. For example, the rain sensor as disclosed with reference to FIGS. 1 to 4 can be replaced by any sensors adapted to detect rain conditions and produce signals having values depending upon rain conditions. Furthermore, although the shown wiper control system has been directed to analog circuitry for controlling the wiper motion, it may replaced with a digital system including a digital processor performing the foregoing control operation depending upon mode selector switch position, the wiper position switch position, the rain condition-indicative signal and other possible control parameters.

What is claimed is:

1. A rain condition dependent wiper control system comprising:
   a windshield wiper;
   a mode selector allowing manual selection of a plurality of operational modes of the wiper including an intermittent mode;
   a rain sensor which detects rain conditions and produces a rain condition signal having a value which varies according to rain conditions, said rain sensor comprising a vibration sensor having a sensor surface exposed towards falling rain and adapted to produce said rain condition signal depending upon the magnitude of impact of raindrops on said sensor surface;
   a wiper drive circuit including an intermittent operation control circuit which includes an integrating means for integrating said rain condition signal value and producing a drive signal which actuates a wiper driver for one cycle of wiper operation whenever the integrated value exceeds a given threshold; and
   a detector which detects when the wiper is in one of a first initial position and a second operating position, said wiper position detector being associated with said integrating means for disabling said integrating means while said wiper is in said second position.

2. The system as set forth in claim 1, wherein said integrating means becomes active when the integrated value exceeds said given threshold to produce said drive signal and reset the integrated value and said integrating means is prevented from integrating the rain condition-indicative signal value as long as said wiper position detector detects that said wiper is in said second position.

3. The system as set forth in claim 2, wherein said wiper position detector is associated with said wiper driver to keep said wiper driver in operation, even when said integrating means is deactivated, for as long as said wiper position detector detects that said wiper in said second position.

4. A rain condition dependent wiper control system comprising:
   a windshield wiper;
   a mode selector allowing manual selection of a plurality of operation modes of the wiper including an intermittent mode;
   a rain sensor which detects rain conditions and produces a rain condition signal having a value which varies according to rain conditions;
   a wiper driver circuit including an intermittent operation control circuit which includes an integrating means for integrating said rain condition signal value and producing a drive signal which actuates a wiper driver for one cycle of wiper operation whenever the integrated value exceeds a given threshold;
   a detector which detects when the wiper is in one of a first initial position and a second operating position, said wiper position detector being associated with said integrating means, for disabling said integrating means while said wiper is in said second position; and
   a wiper position dependent switch means included in said wiper control circuit and associated with said wiper position detector, and interposed between said rain sensor and said integrating means for blocking communication therebetween as long as said wiper position detector detects that said wiper is in said second position and establishing communication between said rain sensor and said integrating means when said first position of said wiper is detected.

5. The system as set forth in claim 4, wherein said rain sensor comprises a vibrator adapted to vibrate in the ultrasonic range in response to the impact of rain drops in order to produce said rain condition-indicative signal, a filter for filtering noise components out of said rain condition-indicative signal, and an amplifier for amplifying said rain condition-indicative signal.

6. A method of controlling the timing of operation of a windshield wiper of an automotive vehicle in accordance with the intensity of rainfall on a windshield comprising the steps of:
   monitoring rain conditions in the vicinity of the windshield by sensing vibrations caused by falling rain;
   producing a rain condition-indicative signal, the level of which varies in accordance with the intensity of the monitored rainfall;
   integrating the rain condition-indicative signal;
   driving the windshield wiper through one cycle of operation to clear the windshield of raindrops when the integrated value of said signal exceeds a predetermined threshold;
   monitoring the operation of the windshield wiper to determine when the current cycle of operation has been completed; and
   preventing execution of said integrating step until completion of the current cycle of windshield wiper operation.

7. A rain condition dependent wiper control system comprising:
   a windshield wiper;
   a mode selector manually operable for selecting one of a plurality of operational modes including an intermittent mode;
   a rain sensor for detector rain conditions, comprising a vibrator for vibrating when struck by a raindrop and producing a vibration signal, a filter for filter noise components out of said vibration signal to produce a filtered signal, and an amplifier for amplifying said filtered signal to produce a rain condition signal representative of the sensed rain conditions;
   a wiper drive circuit adapted to drive said windshield wiper and responsive to said rain condition signal for producing a drive signal for activating a wiper driver at a given timing which is variable depending upon the rain condition represented by said rain condition signal; and
   a wiper position detector for detecting wiper position and for disabling ring condition signal responsive operation of said wiper drive circuit until said wiper is detected to be at an initial position.

8. The system as set forth in claim 7, which further comprises a switch included in said wiper drive circuit and associated with said wiper position detector, which switch completes the wiper drive circuit only when said detector detects the wiper to be at said initial position so as to enable said wiper drive circuit to perform said rain condition signal responsive operation.

9. The system as set forth in claim 7, which further comprises means for holding said wiper drive in an active state while said wiper is in other than said initial position and until the wiper reaches said initial position, irrespective of the presense and absence of said drive signal.

10. An apparatus for controlling a windshield wiper comprising:
    means for sensing rain conditions and for generating a rain condition signal indicative of said sensed rain conditions, said rain sensing means comprising a vibration sensor which vibrates when struck by a raindrop;
    means for detecting whether the windshield wiper is in a predetermined position and for producing a wiper position indication if said detection is positive; and
    means, responsive to said sensing means and said detecting means, for processing said rain condition signal to generate a drive signal to initiate driving of the windshield wiper, said processing means being enabled by the presence of said position indication and inhibited by the absence of said position indication.

11. A method for controlling a windshield wiper comprising:
    (a) sensing rain conditions by sensing vibrations caused by falling rain and generating a rain condition signal indicative of said sensed rain conditions;
    (b) detecting whether the windshield wiper is in a predetermined position and producing a wiper position indication if said detection is positive; and
    (c) processing said rain condition signal to generate a drive signal to initiate driving of the windshield wiper only in the presence of said wiper position indication.

* * * * *